United States Patent [19]

Koppel

[11] Patent Number: 5,339,840
[45] Date of Patent: Aug. 23, 1994

[54] ADJUSTABLE COMB

[75] Inventor: Bernard Koppel, Plantation, Fla.

[73] Assignee: Sunbelt Precision Products Inc., Fort Lauderdale, Fla.

[21] Appl. No.: 53,159

[22] Filed: Apr. 26, 1993

[51] Int. Cl.$^5$ ................ A45D 24/34; A01K 13/00
[52] U.S. Cl. ................ 132/151; 132/152; 119/83; 119/94; 15/144.1
[58] Field of Search ............... 119/83, 86, 94; 132/151, 152, 213.1, 214, 129, 135; 15/144.1

[56] References Cited

U.S. PATENT DOCUMENTS

| 175,097 | 3/1876 | Hotchkiss | 119/94 |
|---|---|---|---|
| 183,305 | 10/1876 | Jenness | 15/144.1 |
| 820,292 | 5/1906 | Dunbar | 15/144.1 |
| 851,567 | 4/1907 | Sutherland | 132/151 |
| 1,663,078 | 3/1928 | Harper | 132/151 |
| 2,304,665 | 12/1942 | Smith et al. | 132/85 |
| 2,503,134 | 4/1950 | Schroeder | 15/172 |
| 2,581,141 | 5/1947 | Raptis | 15/248 |
| 3,115,656 | 7/1961 | McKinstry | 15/115 |
| 3,308,500 | 3/1967 | Woodruff | 15/369 |
| 3,638,665 | 2/1972 | Staffas, Sr. | 132/213.1 |
| 3,690,331 | 8/1972 | Messer | 132/120 |
| 3,928,886 | 12/1975 | Marino et al. | 15/144 A |
| 4,370,773 | 2/1983 | Hadary | 15/172 |
| 5,033,154 | 7/1991 | Marchand et al. | 15/167.1 |
| 5,067,502 | 11/1991 | D'Orsi et al. | 132/213.1 |
| 5,110,230 | 5/1992 | Cole, Jr. et al. | 401/52 |

FOREIGN PATENT DOCUMENTS

| 152852 | 5/1903 | Fed. Rep. of Germany | 132/129 |
|---|---|---|---|
| 560041 | 9/1923 | France | 132/214 |
| 299989 | 9/1954 | Switzerland | 15/144.1 |

*Primary Examiner*—Robert P. Swiatek
*Assistant Examiner*—Todd E. Manahan
*Attorney, Agent, or Firm*—Darby & Darby

[57] ABSTRACT

A comb an adjustable tooth-bearing head piece which allows the user to adjust the head piece to any of a variety of angles with respect to the handle of the comb. The handle has two arms which extend in a forward direction one from each side of the handle. The head piece is adjustably mated with the arms of the handle. In one embodiment, the body of the head piece has a polygonal cross section at least at its ends and the handle arms have corresponding polygonal recesses. The cooperating mating surfaces in the arms and the head piece allow the head piece to assume differing angular positions in an indexed manner with respect to the arms. In another embodiment, the head piece is generally cylindrical and is pivotally attached to the arms. In this embodiment, a retention/indexing member on the handle engages one of a plurality of detents, recesses or flat surfaces of the body of the head piece body in order to both retain the head piece in the arms, and to provide a set of indexed positions of the head piece with respect to the handle.

17 Claims, 4 Drawing Sheets

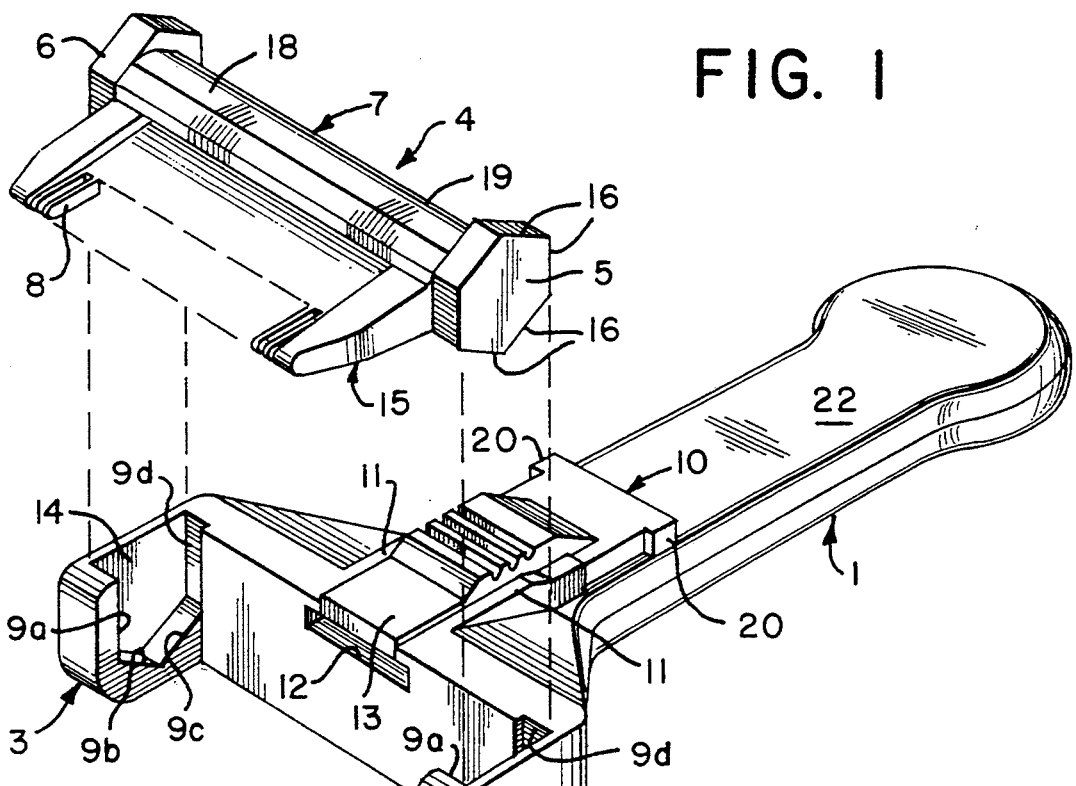
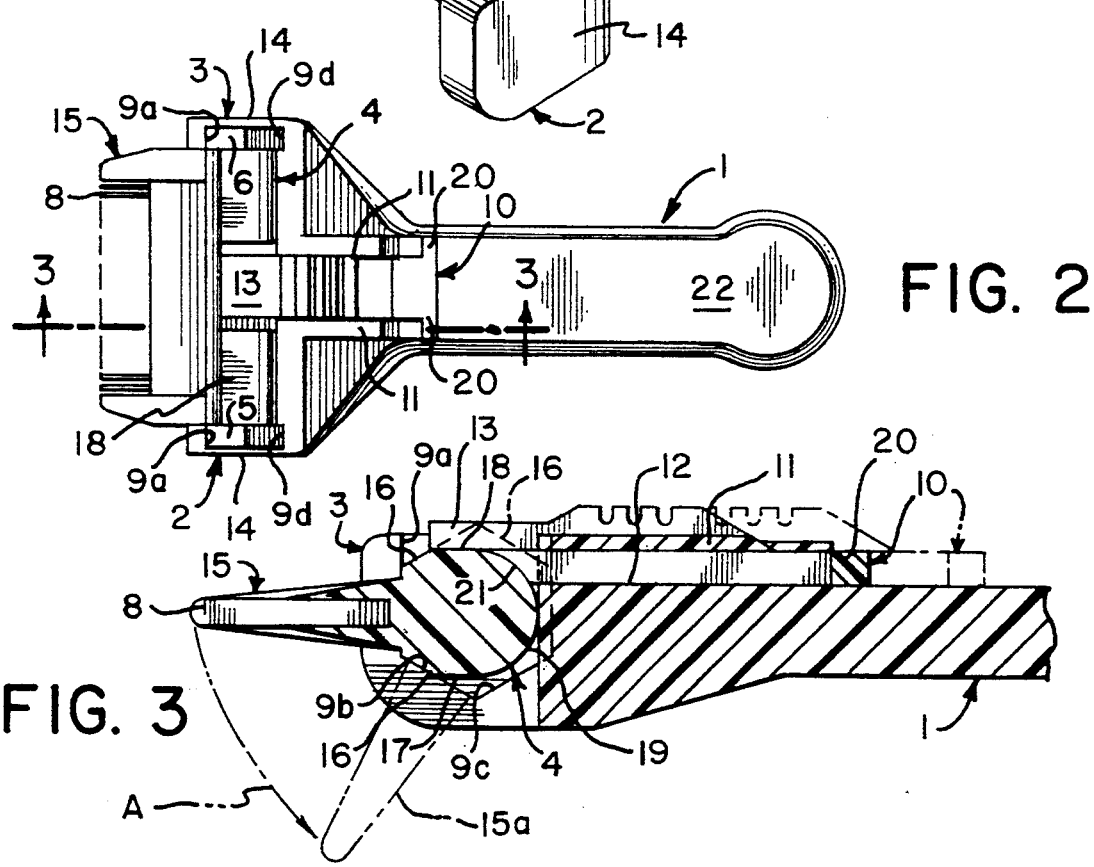

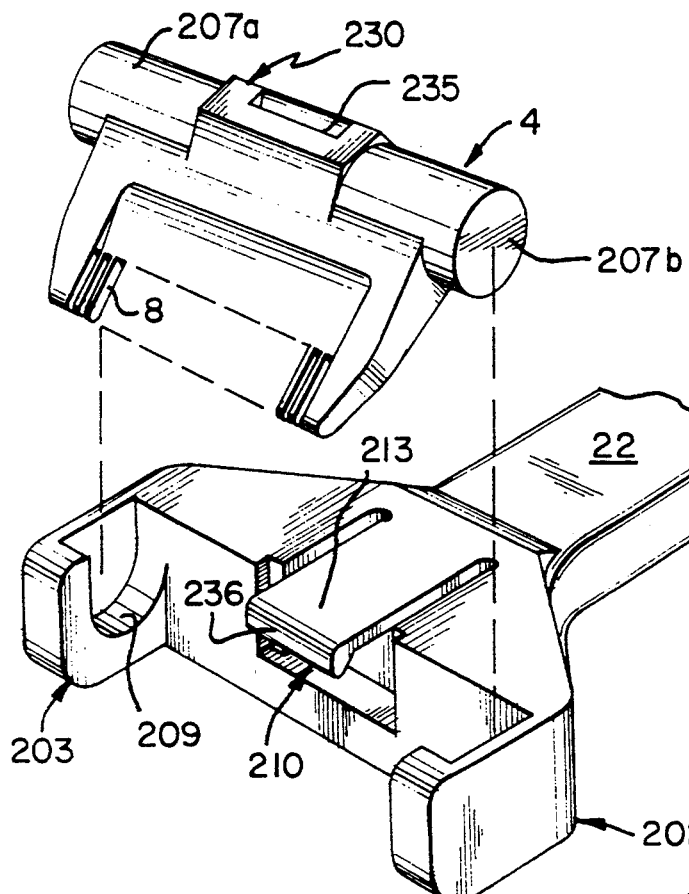
FIG. 6
FIG. 8
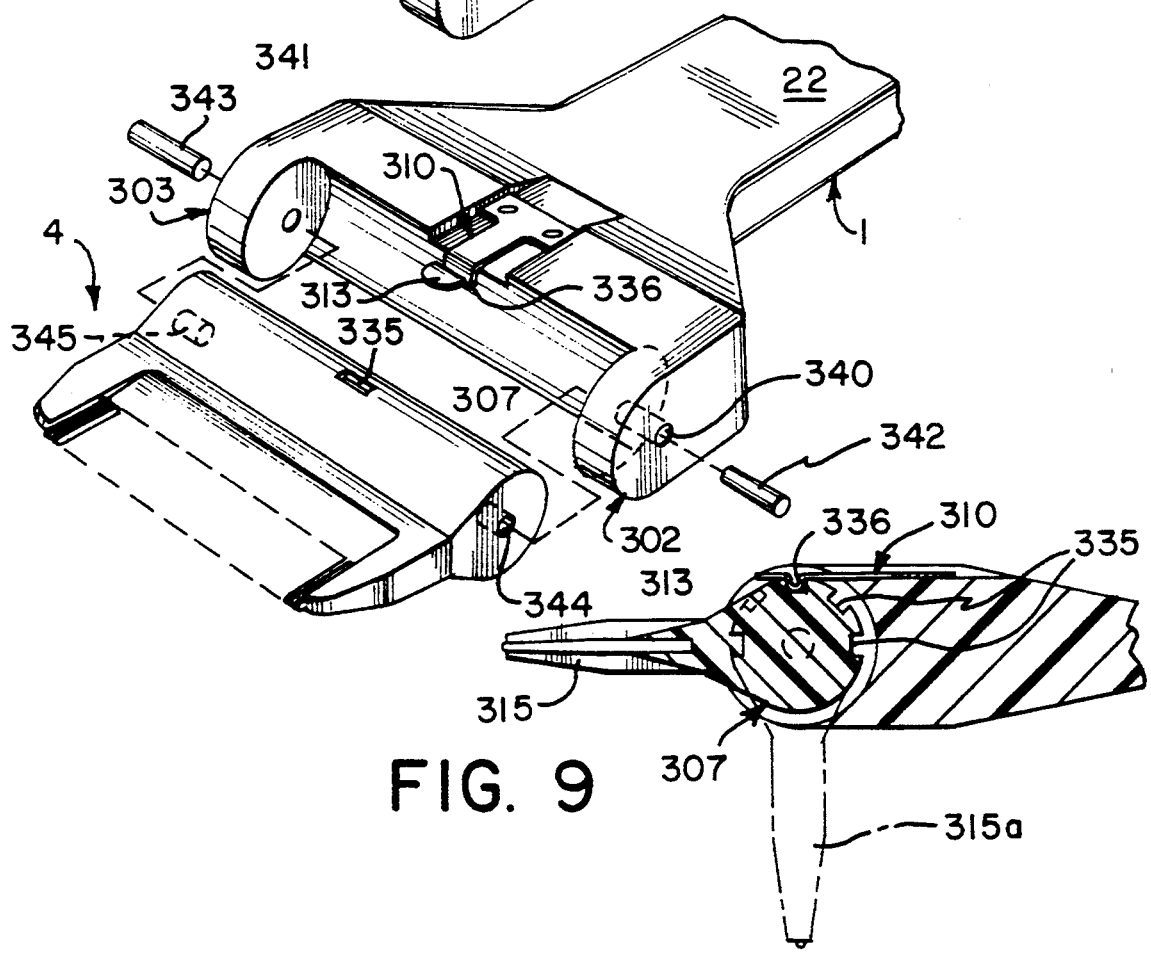
FIG. 9

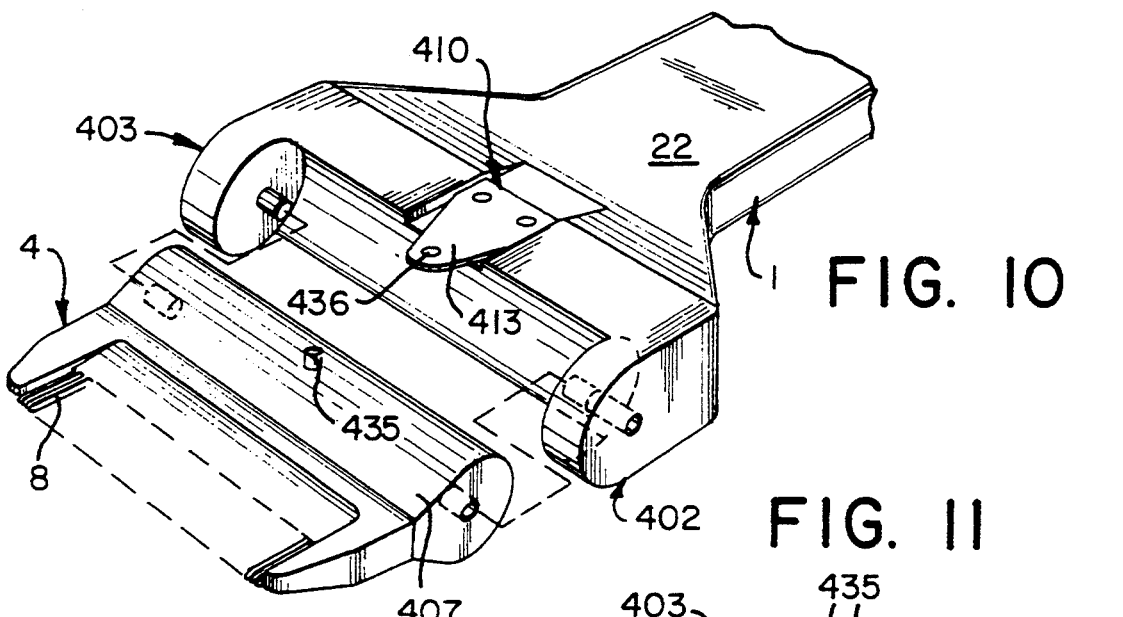
FIG. 10
FIG. 11
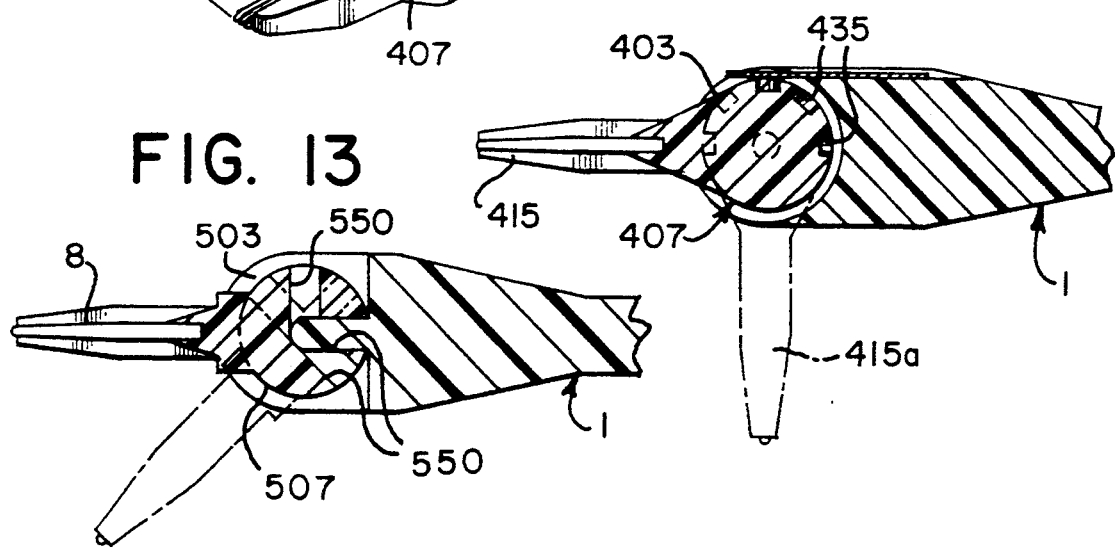
FIG. 13
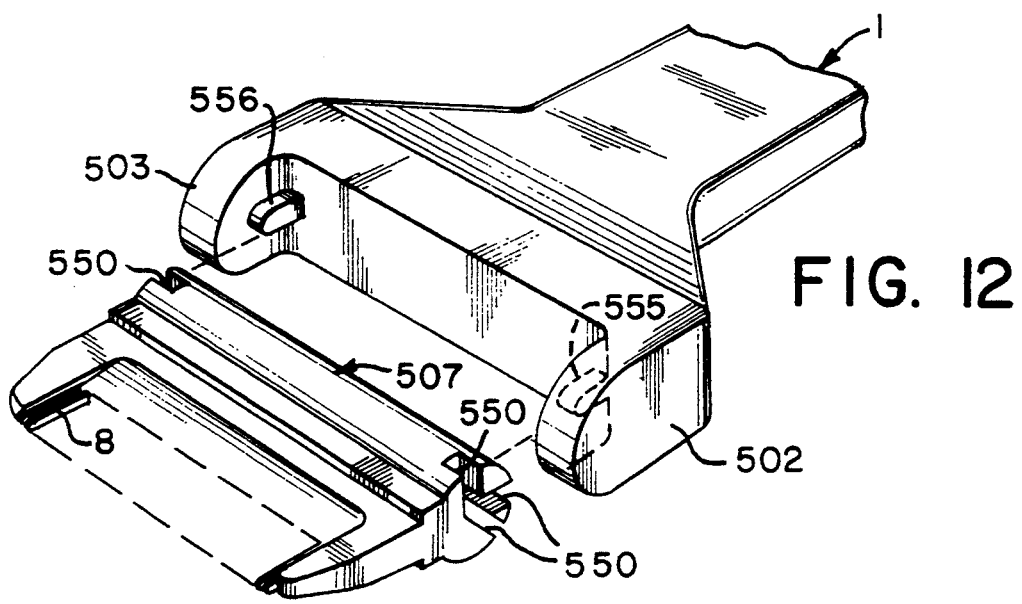
FIG. 12

ADJUSTABLE COMB

FIELD OF THE INVENTION

The present invention relates generally to comb structures, and in particular to comb structures with a head piece or combing unit which is adjustable to more than one angle with respect to the comb handle.

BACKGROUND OF THE INVENTION

Combs are used for both grooming and maintenance of pets. Comb structures, as opposed to brushes, are especially suited to the removal of lice and fleas and their eggs from the hair of animals. In traditional comb structures, the teeth and the handle of the comb are formed integrally and are set at fixed angle with respect to each other. Typically, the teeth and the handle are coplanar. This coplanar relationship renders the task of grooming awkward and even difficult, and it does not facilitate the accuracy required for the proper removal of lice and fleas. Furthermore, the coplanar relationship of the teeth and handle can add to the stress and fatigue of the groomer who must bend and move to attain the proper angle of attack of the comb with respect to the animal.

Traditional combs only have a single arrangement of teeth and do not allow for the insertion of different tooth structures into the same handle. This requires the groomer to stock a full array of grooming devices, each with its own style of handle, in order to accommodate the varied situations encountered with different animals (e.g., long versus short hair).

It is therefore one object of the invention to aid in the grooming and maintenance of animals.

It is a further object to allow relatively easy removal of lice and nits from an animal.

It is also an object of the invention to provide a comb capable of adjusting the angle of the teeth with respect to the handle of the instrument.

It is an additional object to allow for quick interchange of different grooming implements into the same grooming handle.

SUMMARY OF THE INVENTION

The present invention is a comb with an adjustable head piece which allows the operator of the comb to adjust the head piece to any of a variety of angles with respect to the handle of the comb. The comb is comprised of essentially two pieces, a handle, and a head piece or combing unit. The combing unit is formed by a set of teeth (sometimes called a clip) held either fixedly or removably in a teeth holder body (also called a clip holder). At its proximal end, the handle has an elongated member forming a hand grip for the comb. At the distal end of the handle, two arms extend in a forward direction, one from each side of the handle. The clip holder is adjustably mated with the arms of the handle. The clip holder is generally cylindrical in shape, with the teeth extending radially outward along the length of the cylinder. The mating of the clip holder and the handle is accomplished by one of several means. In one embodiment of the invention, the body of the clip holder has a polygonal cross section and the arms have corresponding polygonal recesses (e.g., of a hexagonal cross section). The cooperating mating surfaces in the arms and the clip holder allow the clip holder to be rotated in an indexed manner with respect to the arms (and in turn to the handle). In another embodiment of the invention, the clip holder is attached to the arms by means of pivot pins. In this embodiment, a retention/indexing member in the handle engages one of a plurality of detents or flat surfaces of the body of the clip holder in order both to retain the clip holder in the arms, and provide indexed adjustment of the clip holder with respect to the handle.

BRIEF DESCRIPTION OF THE DRAWINGS

The features and advantages of the present invention will be more fully understood from a reading of the following detailed description, with reference being made to the drawings, in which:

FIG. 1 is a partially exploded isometric view of a first embodiment of a comb according to the present invention.

FIG. 2 is a top elevation view of the first embodiment of the present invention.

FIG. 3 depicts a partial cross-sectional view of the first embodiment taken along line 3—3 of FIG. 2.

FIG. 6 is an exploded partial isometric view of a third embodiment of the present invention.

FIG. 8 is an exploded partial isometric view of a fourth embodiment of the present invention.

FIG. 9 depicts a partial cross-sectional view of an assembled fourth embodiment of the present invention taken along a line similar to that in FIG. 3.

FIG. 10 is an exploded partial isometric view of a fifth embodiment of the present invention.

FIG. 11 depicts a partial cross-sectional view of an assembled fifth embodiment of the present invention taken along a line similar to that in FIG. 3.

FIG. 12 is an exploded partial isometric view of a sixth embodiment of the present invention.

FIG. 13 depicts a partial cross-sectional view of an assembled sixth embodiment of the present invention taken along a line similar to that in FIG. 3.

DETAILED DESCRIPTION OF THE PREFERRED EMBODIMENT

Figure 4:
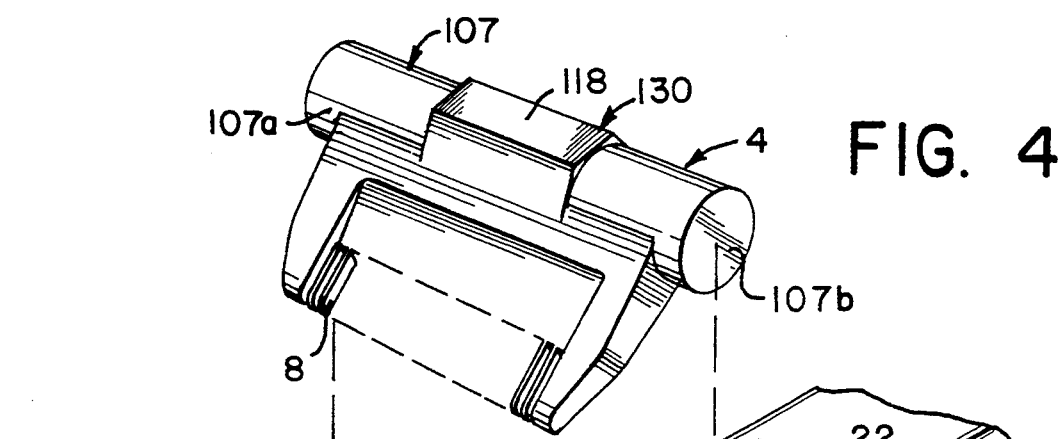
FIG. 4 is an exploded partial isometric view of a second embodiment of the present invention.

Referring now to the drawings in detail, wherein like reference characters designate like elements throughout the several views thereof, FIG. 1 depicts a first embodiment of a comb according to the principles of the present invention. The comb structure has two main pieces, a handle indicated generally at 1, and a clip holder, indicated generally at 4. Both the handle and the clip holder are preferably constructed from a moldable plastic/nylon material such as Cycolac L-2502. The proximal end of the handle 1 is elongated in order to define a hand grip 22. Two arms structures 2 and 3 are integrally attached to the distal end of the handle 1. The two arms 2 and 3 are designed to receive and secure the clip holder 4 in the handle 1.

Arm 3 is essentially defined by four sections having inner walls, 9a–9d. Arm 2 is of a similar construction to that of arm 3 and also contains walls 9a–9d. In this first embodiment of the invention, the four walls, 9a–9d, define an open ended hexagonal structure. The two side walls of the recess, 9a and 9d, are somewhat longer in length than the two bottom walls, 9b and 9c. In the particular embodiment illustrated in FIG. 1, each of the arms 2 and 3 is further defined by an end wall 14. The end walls 14 are not required to practice the present invention, but aid in the retention of the clip holder 4 in arms 2 and 3.

The clip holder 4 contains a toothed portion 15 and a main body 7. Mounted in the toothed portion 15 (also known as a clip) are a plurality of teeth 8. The clip 15 can either be integrally formed as part of the main body 7, or it can alternatively be removably attached in a longitudinal slot in the main body. It may be constructed in the manner described in copending application Ser. No. 07/822,418, filed Jan. 17, 1992. Removable attachment of the toothed portion 15 allows for interchangability of different sizes and/or styles of grooming instruments within the clip holder 4. In one embodiment of the clip 15, the teeth 8 are spaced in close proximity to each other to facilitate the removal of lice and nits.

As seen in FIGS. 1 and 3, the main body 7 of the clip holder 4 is a shaft having a front where the clip 15 is attached, a top 18 and a bottom 17, both of which are flat surfaces, and a rear section 19 which curved and preferably substantially cylindrical in shape. Attached to the ends of the main body 7 are end pieces 5 and 6. In the embodiment of the invention illustrated in FIGS. 1-3, the outer faces 16 of end pieces 5 and 6, are equal in length to each other, and are furthermore approximately equal to the length of each of the two bottom walls 9b and 9c of arms 2 and 3.

In an operational configuration as shown in FIG. 3, the clip holder 4 is inserted into the handle 1, being secured against rotation by arms 2 and 3. The end pieces 5 and 6 of the clip holder mount in the recesses defined by walls 9a-9d and end walls 14 of arms 2 and 3. A face 16 of each of the end pieces 5 and 6 will abut a respective one of the walls 9a-9d. The orientation of the clip holder 4 to the handle 1 depicted in FIGS. 1-3 shows a coplanar relationship between the two when they have been mated (i.e. the teeth 8 are in the same plane as the handle). The cooperating mating surfaces of the end pieces 5 and 6 and the arms 2 and 3, allow the clip holder 4 to be placed in rotatably displaced positions in the arms with respect to the handle. One such rotational change is depicted in FIG. 3 in phantom with the arrow A indicating a counter clockwise rotation from the position shown in solid lines. After the clip holder has been rotated, different faces 16 of end pieces 5 and 6 will abut different ones of the arm walls 9a-9d. The final rotated position 15a depicted in phantom lines illustratively produces a 60 degree angle between the plane of handle 1 and the plane of clip holder 4. If the clip holder 4 is further displaced in the same counter clockwise direction, the clip holder 4 will arrive at a 120 degree angle with respect to the handle 1. The rotation of the clip holder 4 can be described as "indexed" or "stepped" in that the rotation occurs in discrete incremental amounts (e.g., 60 degrees or other desired angle per step). The full counter clockwise rotational displacement of the clip holder 4 is limited only by interference between the clip holder 4 and the handle 1 itself. In a similar manner, the clip holder 4 can be rotated in a clockwise direction to achieve opposite angular configurations with respect to the handle 1. Rotation in a clockwise direction is similarly limited by the interference between the clip holder 4 and the retention member 10, or the handle 1.

The clip holder 4 can be taken out of the handle 1, prior to its angular rotation, or, if the arms are constructed from a suitably pliable and resilient material, the clip holder can be rotated directly within the handle. If rotation within the handle is desired, it is preferable to not have end walls 14 in the arms 2 and 3. The end walls 14 tend to give the arms 2 and 3 a rigidity which is not easily overcome during the rotation of the clip holder 4. Without the end walls 14, the arms 2 and 3 deform outwardly (towards the distal end of the handle 1) during the rotation of clip holder 4, and spring back into operational position after faces 16 and walls 9a-9d have come into abutment.

Retention member 10 rides in a channel 12 formed in the handle 1. The channel is defined by rail guides 11, which allow retention member 10 to move longitudinally along the handle. Retention member 10 has a forward section 13 and two stops 20. The stops 20 prevent the retention member from sliding completely out of the channel 12 towards the distal end of the handle 1. In the retracted position depicted in FIG. 1 and in phantom in FIG. 3, the retention member 10 is not in contact with the main body 7 of the clip holder 4. Once the clip holder 4 has been placed into the handle 1, in a desired orientation, the retention member 10 is extended forward in channel 12 until it comes into abutment with body 7 as is depicted in FIG. 3. The retention member 10 thus aids in retaining the clip holder 4 in the handle 1.

With the clip holder 4 in the coplanar position as depicted in FIG. 3., the bottom surface of the forward section 13 of retention member 10 will abut the body 7 in essentially two locations. A flat surface on the bottom of forward section 13 will abut the flat top surface 18 of the body 7. The curved rear portion 19 of body 7 will abut a portion 21 of forward section 13 having a concave cross section. When the clip holder 4 is into the 60 degree rotated position as indicated in phantom 15a, only the concave portion 21 of the forward section 13 will substantially abut the body 7 (at the rear curved portion 19). The flat portion of the bottom of forward section 13 will only contact the body 7 at one point, instead of along the entire flat surface 18 as in the previous position. If desired, body 7 may be formed with flat areas to abut men%her 10 in the various positions of body 7.

It will be appreciated that several modifications to the embodiment depicted in FIGS. 1-3 are possible without departing from the spirit of the invention. For example, the entire length of body 7 can be constructed with a polygonal cross-section as has been depicted for end pieces 5 and 6. In this modification, specific end pieces 5 and 6 are no longer required, and the body 7 itself will mount in the arms 2 and 3. The shortest diameter of the cross section of body 7 would correspond to the distance between walls 9a and 9d of the arms 2 and 3. A further modification would be to attach the retention member 10 to the handle 1 using a screw or bolt which passes through a slot in the retention member 10. In this manner the screw or bolt can be loosened and the retention member 10 adjusted into or out of its operational position, the screw or bolt riding in the slot in the retention member 10. On tightening, the screw or bolt holds the member 10 in position.

A further modification to the embodiment of the present invention depicted in FIGS. 1-3 would be to form the polygonal cross section of the end pieces 5 and 6 in an octagonal (or other polygonal) configuration.

This modification would require a corresponding change to the recesses in arms 2 and 3. For example, if the end pieces 5 and 6 have an octagonal cross section, the recesses in the arms 2 and 3 would be formed as an open octagon with five walls instead of the four (9a-9d) required for hexagonal end pieces 5 and 6. As described above, the entire body 7 can be formed with other polygonal cross sections than hexagonal or octagonal. A greater number of faces on the polygon of the cross section, produces a finer "stepping" or "indexing" of the rotation of the clip holder 4. For example, one step of the octagonal embodiment will produce 45 degrees of displacement.

Figure 5:
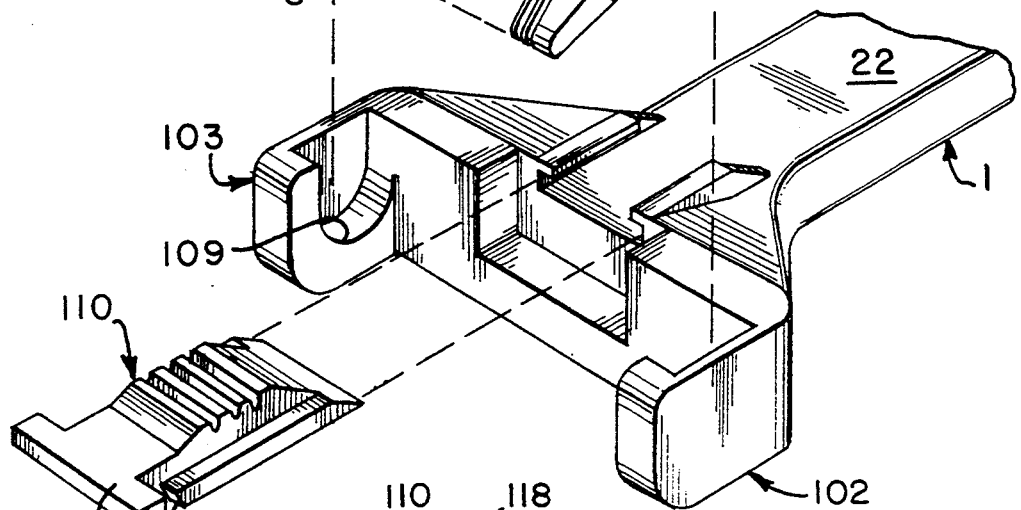
FIG. 5 depicts a partial cross-sectional view of an assembled second embodiment of the present invention taken along a line similar to that in FIG. 3.

FIGS. 4 and 5 illustrate a second embodiment of the present invention which includes certain modifications to the clip holder 4, the retention member 110, and arms 103 and 102. In this embodiment, the body 107 of the clip holder 4 has cylindrically shaped ends 107a and 107b. A central portion 130 of body 107 is formed with a polygonal cross section, illustratively shown in FIGS. 4 and 5 to be hexagonal. The recesses in arms 102 and 103 are primarily defined by a single semicircular wall 109. In its operational position as depicted in FIG. 5, the clip holder 4 is disposed in the recesses in the arms 102 and 103. The ends 107a and 107b of the body 107 act as pivot points when they are in contact with walls 109 of the arms 102 and 103. Absent the cooperation of the central portion 130 and the retention member 110, the clip holder 4 would freely rotate about the axis of body 107.

The central portion 130 and the retention member 110 cooperate to create an indexed rotational displacement of the clip holder 4 with respect to the handle 1. In the operational position depicted in FIG. 5, a flat bottom surface of forward section 113 of retention member 110 is in contact with one of the faces 118 of the clip body central portion 130. An angled portion 121 of the bottom of forward section 113 abuts an adjacent face 118 of the central portion 130. The specific angle of the angled portion 121 depend on the number of faces 118 of the polygonal cross section of central portion 130. For example, in the embodiment shown in FIGS. 4 and 5, the angled portion 121 will be at a 60 degree angle with respect the handle 1 (corresponding to the 60 degree interior angle of a hexagonal structure). Most of the modifications described in relation to the first embodiment of the invention depicted in FIGS. 1-3 are also applicable to this second embodiment.

Figure 7:
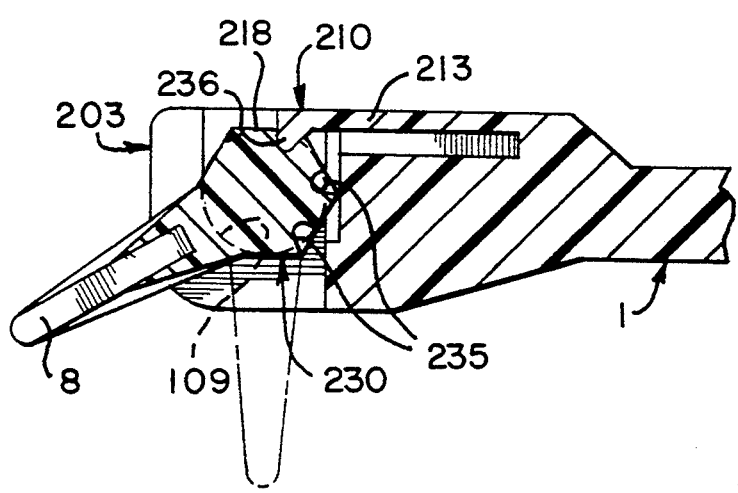
FIG. 7 depicts a partial cross-sectional view of an assembled third embodiment of the present invention taken along a line similar to that in FIG. 3.

A third embodiment of the invention is illustrated in FIGS. 6 and 7. The third embodiment has features similar to the ones depicted in FIGS. 4 and 5 with further modifications to the central portion 230 and the retention member 210. In this embodiment, the cylindrically shaped clip holder ends 207a and 207b are disposed in the recesses defined by walls 209 as discussed with respect to FIGS. 4 and 5. Again, central portion 230 is formed with a polygonal cross section, shown in FIGS. 6 and 7 to be illustratively hexagonal. Central portion 230 and retention member 210 again cooperate to create an indexed rotation of the clip holder 4. As seen most clearly in FIG. 6, the resiliently flexible retention member 210 is integrally formed with the handle 1 instead of being slidably attached as was previously depicted in FIGS. 1-5. The integral design of the retention member depicted in FIGS. 6 and 7 can be used in any of the previous embodiments, and the slidable retention member of those previous embodiments may be used in the FIG. 6-7 embodiment. The forward portion 213 of the retention member 210 has a depending finger 236. Central portion 230 of the clip holder has been modified to provide recesses 235, forming detents in each of the faces 218. One of the recesses 235 engages the finger 236 of the retention member 210 when the clip holder 4 is in an operational position as depicted in FIG. 7. As the clip holder 4 is rotated, the finger 236 will engage successive recesses 235 in adjacent faces 218 of the central portion 230. The detenting action caused by the cooperation of the central portion 230 and the retention member 210 acts to index the rotation of the clip holder 4 and hold it in place.

Illustrated in FIGS. 8 and 9 is a fourth embodiment of the present invention. This embodiment modified body 307, arms 302 and 303, and retention member 310. The most significant modification to the comb is in the manner in which the clip holder 4 is held in the handle 1. In this embodiment, the entire body 307 is substantially cylindrical in shape, and has sockets 344 and 345 in respective ends thereof. Instead of having recesses, arms 302 and 303 have pivot holes 340 and 341 through their respective centers. When the clip holder 4 is in its operational position, as depicted in FIG. 9, the holes 340 and 341 are in registration with the respective sockets 344 and 345 in the body 307. Once registration has been achieved, pivot pins 342 and 343 are inserted through holes 340 and 341 and mate with sockets 344 and 345 respectively. In this manner, clip holder 4 is able to rotate in the handle 1 about pivot pins 342 and 343.

The body 307 and the retention member 310 have again been designed to create an indexed rotation of the clip holder 4 with respect to the handle 1. Body 307 is provided with recesses 335 around its peripheral surface, approximately in the center (longitudinally) of the body 307. A retention member 310 is fixedly attached to handle 1, and can essentially be described as a clip spring. The forward portion 313 of the retention member 310 has a downward extending bend 336. The bend 336 engages one of a plurality of recesses 335 in body 307. When the clip holder 4 is rotated, as is depicted in phantom in FIG. 9, the bend 336 will engage successive recesses 335 in body 307 thereby providing indexed adjustment.

A fifth embodiment of the conch of the present invention is depicted in FIGS. 10 and 11. This embodiment is similar to that of the embodiment shown in FIGS. 8 and 9 with modified to the body 407 and retention member 410. The clip holder 4 is held in the handle in the same manner as was described with respect to FIGS. 8 and 9. The body 407 and the retention member 410 have again been designed to create an indexed rotation of the clip holder 4 with respect to the handle 1. Body 407 is provided with recesses 435 (which may be circular or rectangular in cross-section) around its peripheral surface, approximately in the center (longitudinally) of the body 407. Retention member 310 is fixedly attached to handle 1, and is again a clip spring. The forward portion 413 has a downward depending tab or button 436. The button 436 engages one of the recesses 435 in body 407 when the clip holder 4 is in its operational position as depicted in FIG. 11. As the clip holder 4 is rotated, as is depicted in phantom in FIG. 11, the button 436 will engage successive recesses 435 in body 407 thereby providing indexed adjustment.

FIGS. 12 and 13 depict a sixth embodiment of the present invention. This embodiment is essentially that of the embodiment in FIGS. 8 and 9 with modifications to the arrangement for attaching the clip holder 4 to the handle 1. The clip holder body 507 is substantially cylindrical in shape and has radial slots 550 cut into each of its ends at various angles. Arms 502 and 503 of the handle have respective keys 555 and 556 approximately in the center of their interior facing walls. When the clip holder 4 is in its operational position, as depicted in FIG. 13, the keys 555 and 556 in arms 502 and 503 will mate with corresponding slots 550 in the body 507. In this embodiment depicted in FIGS. 12 and 13, each end of the body 507 has three slots 550 therein. These slots have been cut to provide three different angular positions of the clip holder 4 with respect to the handle 1. Alternatively, the three slots 550 could be placed at different angular positions, or more slots could be cut to provide more positions. In order to rotate this particular embodiment of the invention, the clip holder 4 must be removed from the handle 1 and reinserted in its new position.

A retention member, similar to the ones shown in FIGS. 1–11 can be used to hold the clip holder body 507 in the handle 1.

Having thus described the present invention, it is to be understood that the above described devices are illustrative of the principles of the present invention, and that other devices may be devised by those skilled in the art without departing from the spirit and scope of the invention.

I claim:

1. An adjustable comb comprising:
   a handle having proximal and distal ends;
   first and second arms attached to said distal end of said handle, each of said arms having walls defining a polygonal recess in each of said arms;
   a grip section at said proximal end of said handle;
   a head piece having a body and a comb portion containing teeth, said comb portion being attached to said body, said head piece is rotatably attached to said distal end of said handle at said arms;
   said body is a shaft having two ends;
   an end piece attached to each of said two ends of said body, said end pieces having polygonal cross section, said polygonal cross section defining faces of said end pieces; and
   each of said walls of said arms abuttably contacting one of said faces of each of said end pieces.

2. A comb according to claim 1 further comprising:
   a retention member on said handle, said retention member abutting said body of said head piece when said retention member and said head piece are in an operational position;
   said body having a central portion; and
   said retention member abuts said central portion of said body when said retention member and said head piece are in said operational position.

3. A comb according to claim 2 wherein said retention member is slidably mounted on said handle.

4. A comb according to claim 2 wherein:
   said body has a central portion, said retention member abutting said central portion of said body when said retention member and said head piece are in an operational position; and
   said central portion has recesses formed therein.

5. A comb according to claim 4 wherein said retention member has a projection depending from a forward section thereof, said projection mating with one of said recesses in said central portion when said retention member and said head piece are in said operational position.

6. A comb according to claim 4 wherein said retention member has a resilient finger depending from a forward section thereof, said finger mating with one of said recesses in said central section when said retention member and said head piece are in said operational position.

7. An adjustable comb comprising:
   a handle having proximal and distal ends;
   a grip section at said proximal end of said handle;
   first and second arms attached to said distal end of said handle, each of said arms having walls defining a polygonal recess in each of said arms;
   a head piece having a body and a comb portion containing teeth, said comb portion is attached to said body, said head piece is rotatably attached to said distal end of said handle at said arms, said body is a shaft having two ends;
   a retention member on said handle, said retention member abutting said body of said head piece when said retention member and said head piece are in an operational position;
   an end piece attached to each of said two end of said body, said end pieces having polygonal cross section, said polygonal cross section defining faces of said end pieces; and
   each of said walls of said arms abuttably contacting one of said faces of each of said end pieces.

8. A comb according to claim 7 wherein said retention member is slidably attached to said handle.

9. A comb according to claim 7 wherein:
   said body has a central portion;
   said central portion has recesses formed therein; and
   said retention member abuts said central portion of said body when said retention member and said head piece are in said operational position.

10. A comb according to claim 9 wherein said retention member has a projection depending from a forward section thereof, said projection mating with one of said recesses in said central portion when said retention member and said head piece are in said operational position.

11. A comb according to claim 9 wherein said retention member has a resilient finger depending from a forward section thereof, said finger mating with one of said recesses in said central section when said retention member and said head piece are in said operational position.

12. An adjustable comb comprising:
    a handle having proximal and distal ends;
    a grip section at said proximal end of said handle;
    first and second arms attached to said distal end of said handle;
    a head piece having a body and a comb portion containing teeth, said comb portion is attached to said body, said head piece is rotatably attached to said distal end of said handle at said arms, said body having a central portion;
    a retention member on said handle, said retention member abutting said central portion of said body when said retention member and said head piece are in an operational position; and
    said central portion having recesses formed therein.

13. An adjustable comb according to claim 12 wherein said retention member has a projection depending from a forward section thereof, said projection mating with one of said recesses in said central portion when said retention member and said head piece are in said operational position.

14. An adjustable comb according to claim 13 wherein:

each of said arms has a polygonal recess therein, said polygonal recesses being defined by walls.

15. A comb according to claim 14 wherein:

said body is a shaft having a polygonal cross section, said polygonal cross section defining faces of said body;

each of said walls of said polygonal recesses abuttably contacting respective faces of said body.

16. An adjustable comb according to claim 12 wherein:

each of said arms has a semicircular recess;

said body is a shaft having a circular cross section; and

17. A comb according to claim 12 wherein said retention member has a resilient finger depending from a forward section thereof, said finger mating with one of said recesses in said central section when said retention member and said head piece are in said operational position.

* * * * *